(No Model.)
C. SWAN.
FLYING TARGET TRAP.
No. 356,297. Patented Jan. 18, 1887.
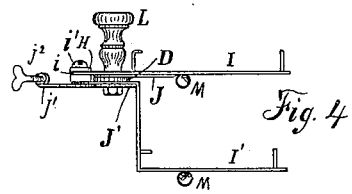
Fig. 4
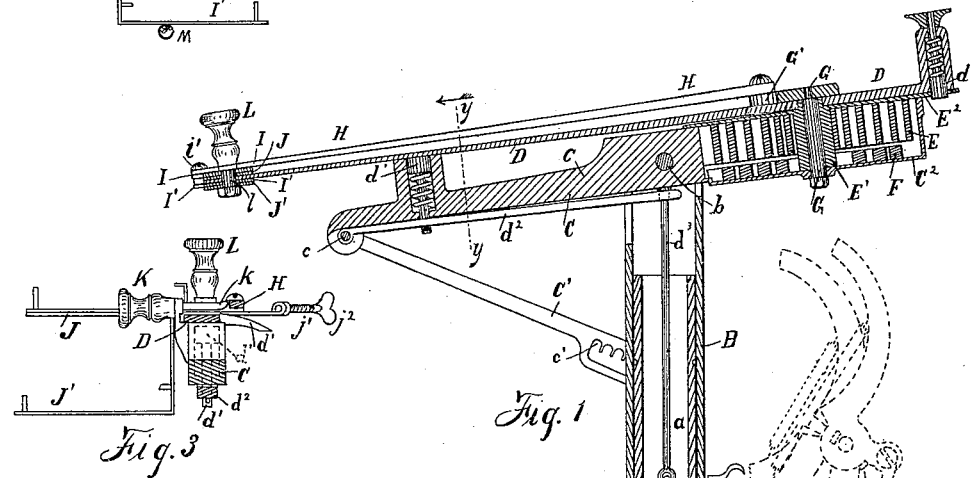
Fig. 3  Fig. 1
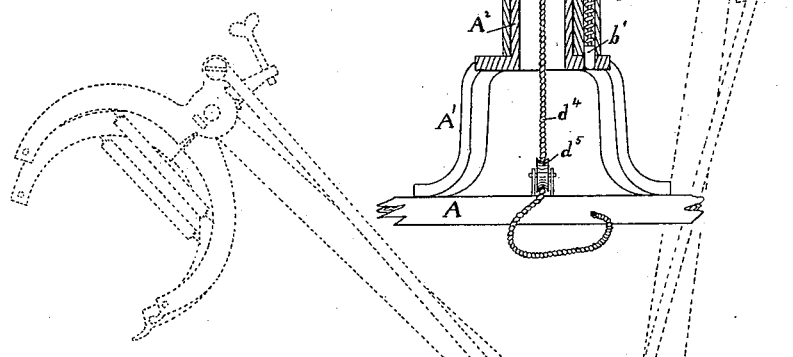
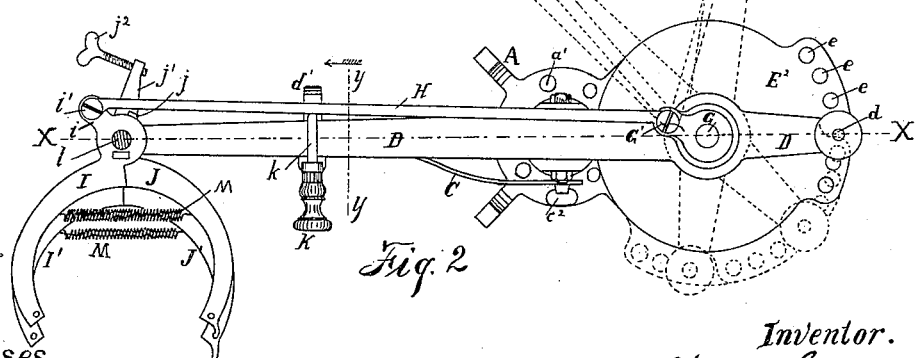
Fig. 2
Witnesses.
Rob't. H. Porter
Geo. P. Lechner
Inventor.
Charles Swan
per Hallock & Hallock
atty's

UNITED STATES PATENT OFFICE.

CHARLES SWAN, OF CORRY, PENNSYLVANIA.

FLYING-TARGET TRAP.

SPECIFICATION forming part of Letters Patent No. 356,297, dated January 18, 1887.

Application filed August 21, 1886. Serial No. 211,527. (No model.)

*To all whom it may concern:*

Be it known that I, CHARLES SWAN, a citizen of the United States, residing at Corry, in the county of Erie and State of Pennsylvania, have invented certain new and useful Improvements in Flying-Target Traps; and I do hereby declare the following to be a full, clear, and exact description of the invention, such as will enable others skilled in the art to which it appertains to make and use the same.

This invention relates to traps for throwing artificial pigeons; and it consists in certain improvements in the construction and operation thereof, as will be hereinafter fully set forth, and pointed out in the claims.

My invention is illustrated as follows: Figure 1 is a vertical section on the line $x\ x$ in Fig. 2. Fig. 2 is a top or plan view of the trap when set, with the arm or sling shown in two other positions by dotted lines. Fig. 3 is a cross-section on the line $y\ y$ in Figs. 1 and 2, looking in the direction of the arrows. Fig. 4 is an elevation of the end of the arm or sling, looking in the direction of the arrow on the left of Fig. 2.

The construction is as follows: A A' A² is the stand, and $a$ is a central opening up through the stalk or stem A² of the stand. B is a sleeve swiveled on the said stalk or stem A², and is provided with a spring-bolt, $b'$, which engages with holes $a'$ in the top of the part A' of the stand, by which means the sleeve can be held from turning on the stem at any point of adjustment desired.

C is a cross-head pivoted at $b$ to the sleeve B, so it can be set at any desired angle to the vertical axis of the stand.

C' is a brace pivoted at $c$ to the cross-head, and provided with a notched slot, $c'$, at its loose end, which slot engages with a set-screw, $c^2$, on the sleeve B. By this device the cross-head can be set at any desired angle and secured firmly in that position. At the opposite end of the cross-head from the brace C' is a spring-box, C², in which is contained a spring, E, for actuating the sling, and a second spring, F, which acts as a buffer to receive or cushion the action of the spring E.

The spring E is mounted on a hub, E', which is connected with or made a part of a disk, E², which covers the spring-box. The hub E' extends above the disk E² and forms the pivot of the arm or sling D. The sling D has at its short end a spring-bolt, $d$, which engages with holes $e\ e$, &c., in the said disk E². The initial tension of the spring E is graduated by the adjustment of the arm D with relation to the disk E², and the arm is secured at any desired point by the engagement of the said spring-bolt $d$ with the proper hole $e$ in said disk.

The catch and trigger of the trap are as follows: $d'$ is a spring-catch on the cross-head C. $d^2$ is a lever lying on the under side of the cross-head pivoted at $c$, and having its loose end directly under the pivot $b$, where it connects with a rod, $d^3$, which runs some distance down the central opening, $a$, in the stalk A², where a cord, $d^4$, is attached to it and passes through the sheave $d^5$. The lever $d^2$ is connected with the spring-catch $d'$, and by drawing on the cord $d^4$ the spring-catch $d'$ will be depressed. Opposite the spring-catch is a knob, K, and over it is a guard-pin, $k$. When the sling D is to be set, it is drawn around by grasping the knob L at its end with one hand and holding the cross-head by grasping the knob K with the other hand, the arm or sling is drawn under the guard-pin or finger $k$, and engaged by the catch $d'$. To spring the trap, the cord $d^4$ is pulled and the lever $d^2$ is thereby depressed and the catch $d'$ disengaged from the arm D.

It will be observed that as the trigger-cord runs to the axial point of the swivel of the trap and passes up to and engages with the trigger-lever on the axial line within the hollow stem A², the said cord cannot become entangled or wrapped around the standard, but is always in condition for action without any care or attention on the part of the attendant.

The next feature of my construction relates to the bird-holders and the means for releasing the bird. There are two bird-holders at the end of the arm or sling, one above the other. I and J are the jaws of the upper bird-holder and I' and J' the jaws of the lower bird-holder. These jaws are all pivoted on the end of the arm D by a common pivot, $l$, and each pair is connected together by the springs M M. The outer jaws of each pair (I and I') are provided with short arms $i$, back of the pivot, which are connected by a stud, $i'$. The two other jaws, J and J', have short arms $j$ and $j'$, which also extend back of the pivot, but are not connected together. One of these arms, $j'$, which is the one connected with the lower jaw, J', is longer than the other, and is provided with a set-screw, $j^2$, at its end. Each of these arms $j$ and $j'$ is so formed—that is, bent up—that it will come in contact with the arm D when the jaws are turned around far enough on the pivot $l$, as seen by dotted lines at the right of Fig. 2. On the bolt G, which passes through the hub E' and holds it in place within the spring-box, is an arm, G', and a rod, H, connects this arm with the arms $i\ i$ of the jaws I I'. The connection at each end of the rod H is pivoted, so the parts can move upon each other.

By observing Fig. 2 it will be seen that as the arm D swings on its pivot the connecting-rod H will cause the jaws of the bird-holder to swing on their pivot also, and that as soon as the arms $j\ j'$ of the jaws J J' come in contact with the arm D they can move no farther on their pivot; but the other jaws, I and I', will not thereby be stopped, and will overcome the springs M M and move away from the other jaws—that is to say, they will open and release the bird. The object of the set-screw $j^2$ in the arm $j'$ is to regulate the time of its contact with the arm D, and thus regulate the time of the escape of the bird. This screw may be set so as to release the bird in the under jaws more or less time after the bird in the upper jaws has been released.

It will be observed that the jaws of the bird or target holder are opened by a positive movement of the jaws, in place of, as heretofore, depending on the momentum of the sling-arm to throw the jaws open, or throw the target out of the holder.

What I claim as new is—

1. In a flying-target trap, the combination, substantially as set forth, of a stand having a stalk, $A^2$, a sleeve swiveled on said stalk, a cross-head pivoted on said swiveled sleeve, a sling-arm pivoted on said cross-head, a spring for actuating said sling-arm, a catch for retaining said sling-arm, a trigger for releasing said catch, and a target-holder at the end of said sling-arm.

2. In a flying-target trap, the combination, substantially as set forth, of a stand having a stalk, $A^2$, a sleeve swiveled on said stalk and having a bolt, $b'$, for engaging with holes $a'$ at the base of said stalk, a cross-head pivoted so as to swing vertically on said sleeve, and a target-sling adjusted on said cross-head.

3. In a flying-target trap, the combination, substantially as set forth, of a stand having a stalk, $A^2$, a sleeve swiveled on said stalk and having a bolt, $b'$, for engaging with holes $a'$ at the base of said stalk, a cross-head pivoted so as to swing vertically on said sleeve, an adjustable brace, C', for regulating the incline of said cross-head, and a target-sling adjusted on said cross-head.

4. In a flying-target trap, the combination, substantially as set forth, of a swiveled stand, a cross-head pivoted so as to tilt vertically on said stand, an opening for the trigger-cord vertically through the stalk of said stand, a target-sling pivoted at one end of said cross-head so as to swing in a plane parallel with said cross-head, a spring for actuating said sling, a catch at the opposite end of said cross-head for retaining said sling, and a trigger for disengaging said catch, which is connected with the trigger-cord in said vertical opening in the stalk of said stand.

5. In a flying-target trap, the combination, substantially as set forth, of a swiveled stand, a cross-head pivoted to tilt vertically on said stand, a spring-case, $C^2$, at one end of said cross-head, and a sling-catch, $d'$, at the other end, a coiled spring, E, contained within said case and connected, as described, with the hub E' and disk $E^2$, and a sling-arm, D, pivoted on said hub and adjustably connected with said disk.

6. In a flying-target trap, the combination, substantially as shown, of the cross-head C, the spring-case $C^2$ at one end of said cross-head, the spring E, contained within said case, the hub E', connected with said spring, and the disk $E^2$, forming a cover to said case, the sling-arm D, pivoted on said hub and adjustably connected with said disk, and a catch, $d'$, at the opposite end of said cross-head for retaining said sling-arm.

7. In a flying-target trap, the combination, substantially as shown, of the cross-head C, the spring-case $C^2$ at one end of said cross-head, the spring E, contained within said case, the hub E', connected with said spring, and the disk $E^2$, forming a cover to said case, the sling-arm D, pivoted on said hub and adjustably connected with said disk, a catch, $d'$, at the opposite end of said cross-head for retaining said sling-arm, and a spring, F, contained within said case for cushioning the recoil of said spring E.

8. In a flying-target trap, the combination, substantially as set forth, of a sling-arm, a target-holder pivoted at the end of said sling-arm, a crank-arm on the pivot of said sling-arm, a crank-arm on said target-holder, and a connecting-rod connecting said crank-arms, said crank-arms and connecting-rod being arranged in a manner substantially as shown, whereby as the sling-arm moves upon its pivot the target-holder will be also swung on its pivot.

9. In a flying-target trap, the combination, substantially as set forth, of a sling-arm, a target-holder consisting of the jaws I and J, pivoted on the end of said sling-arm, an arm, $j$, on the jaw J, which comes in contact with the arm D and limits the pivotal movement of said jaw, a crank-arm, $i$, on the jaw I, for turning it on its pivot, a spring-connection between the jaws I and J, to cause the jaw J to move with the jaw I until its movement is stopped, a crank-arm, G', on the pivot of the arm D, and a connecting-rod, H, connecting the crank-arms G' and i, as shown, and for the purposes mentioned.

10. In a flying-target trap, the combination, substantially as set forth, of a sling-arm, D, two target-holders pivoted by a common pivot on the end of said arm, the outer jaws, I and I', of which are connected together by their crank-arms, and the inner jaws, J and J', have their limiting-arms j and j' constructed so that the limitation of one may be different from the other, a crank-arm, G', on the pivot of said sling-arm, and a connecting-rod, H, connecting said crank-arm G' with the crank-arms of the jaws I I', as shown, and for the purposes mentioned.

In testimony whereof I affix my signature in presence of two witnesses.

CHARLES SWAN.

Witnesses:
 ROBT. H. PORTER,
 F. B. WHIPPLE.